United States Patent
Battaglia et al.

(10) Patent No.: US 12,443,469 B2
(45) Date of Patent: Oct. 14, 2025

(54) SYSTEM AND METHOD FOR AUTOMATIC DISCOVERY OF CANDIDATE APPLICATION PROGRAMMING INTERFACES AND DEPENDENCIES TO BE PUBLISHED

(71) Applicant: Salesforce, Inc., San Francisco, CA (US)

(72) Inventors: Martin Battaglia, Buenos Aires (AR); Alvaro Gaita, Buenos Aires (AR); Leandro Bauret, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 113 days.

(21) Appl. No.: 17/520,074

(22) Filed: Nov. 5, 2021

(65) Prior Publication Data

US 2023/0086564 A1    Mar. 23, 2023

Related U.S. Application Data (60) Provisional application No. 63/246,189, filed on Sep. 20, 2021.

(51) Int. Cl.
*G06F 9/54* (2006.01)
(52) U.S. Cl.
CPC .................................. *G06F 9/544* (2013.01)
(58) Field of Classification Search
None
See application file for complete search history.

(56) References Cited

U.S. PATENT DOCUMENTS

| | | | | |
|---|---|---|---|---|
| 8,893,077 | B1* | 11/2014 | Aiuto | G06F 8/36 |
| | | | | 717/106 |
| 10,908,971 | B1* | 2/2021 | Gonzalez | G06F 8/41 |
| 2009/0287670 | A1* | 11/2009 | Hou | G06F 16/835 |
| | | | | 707/999.102 |
| 2014/0047368 | A1* | 2/2014 | Yang | G06Q 10/10 |
| | | | | 715/769 |
| 2014/0359261 | A1* | 12/2014 | Collins | G06F 8/60 |
| | | | | 713/1 |
| 2017/0102925 | A1* | 4/2017 | Ali | G06F 8/30 |
| 2018/0173522 | A1* | 6/2018 | Hamill | G06F 8/60 |
| 2019/0220331 | A1* | 7/2019 | Duggal | G06F 9/542 |
| 2020/0364033 | A1* | 11/2020 | Lester | G06F 9/54 |

(Continued)

*Primary Examiner* — Umut Onat
(74) *Attorney, Agent, or Firm* — Sterne, Kessler, Goldstein & Fox P.L.L.C.

(57) ABSTRACT

Disclosed herein are system, method, and computer program product embodiments for automatically discovering an API for publishing within a data repository. A discovery tool is used either on a server computer or a customer computer to examine the files stored in the data repository. A search of the repository is conducted to identify root API files that form the basis of an API. A first examination is conducted in which the files are examined for common indicia associated with known API standards. Then a second examination is done of the root API candidates found in the first examination to identify which of the root API candidates is actually a root API. Once the root API has been located, it is executed in a computer environment, and its dependents are detected. Once all the necessary API files have been located, they are packaged and automatically published.

20 Claims, 6 Drawing Sheets

(56) References Cited

U.S. PATENT DOCUMENTS

| | | | |
|---|---|---|---|
| 2020/0371851 A1* | 11/2020 | Liu | G06F 8/62 |
| 2020/0372088 A1* | 11/2020 | Liu | G06F 16/9532 |
| 2021/0099483 A1* | 4/2021 | Shukla | G06F 21/566 |
| 2021/0216288 A1* | 7/2021 | Bahrami | G06F 11/3688 |

* cited by examiner

SYSTEM AND METHOD FOR AUTOMATIC DISCOVERY OF CANDIDATE APPLICATION PROGRAMMING INTERFACES AND DEPENDENCIES TO BE PUBLISHED

CROSS-REFERENCE TO RELATED APPLICATIONS

This application claims the benefit of U.S. Provisional Application No. 63/246,189, which was filed on Sep. 20, 2021, and which is hereby incorporated by reference in its entirety.

BACKGROUND

Technical Field

One or more implementations relate to the field of Application Programming Interfaces (APIs), and more specifically, to the automatic discovery and publication of customer APIs and their dependencies.

Background Art

As connectivity between computer and mobile devices continues to develop, applications have been developed that communicate and share information. Commonly, applications may communicate via an Application Programming Interface (API). An API is a software interface offering a service to other programs to communicate data. APIs may have several different components, such as specifications, markdown documents, etc. that constitute part of an API's development. Thus, a developer wishing to publish an API must not only identify the root API file, but also all the necessary components associated with that API.

As APIs continue to be developed and utilized, many large enterprise organizations may develop or implement dozens or even hundreds of APIs. These APIs may exist at varying stages of an API development lifecycle. For example, some APIs may have been publically released and implemented by customers or consumers; some APIs may be released as a test build or beta; and other may be still in internal testing or development. For the APIs that have been released, developers may continue updating or patching APIs with newer versions. While new API implementation code may be released, developers may neglect the maintenance of updating public API documentation, such as the API specification. Oftentimes, these files are kept within the developer's repository. As a result, finding all the necessary files for a particular API can be quite tedious.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for automatically discovering Application Programming Interfaces (APIs) and their dependencies.

In some embodiments, an automatic discovery tool is used to traverse a repository of files and identify APIs for publishing. The automatic discovery tool may be implemented using a command line interface (CLI) and/or an application service. The discovery and publishing of APIs may correspond to updated APIs that have previously been published on an application exchange platform implemented on an application exchange system. The application exchange platform may be an application marketplace or online store allowing consumers to install, implement, and/or download applications, which may include services, software, extensions, and/or programs. The applications may have corresponding APIs with API specifications.

The automatic discovery tool is implemented at an API development system on either a server side or a developer side. The tool traverses a file repository that stores API and other files and analyzes those files to identify API root files. Once the root files are identified, the automatic discovery tool traverses the API specification tree to identify dependents and specification documents associated with the API. Once the entire API specification tree has been traversed, and all relevant files have been identified, the automatic discovery tool can either automatically package and publish the API, or report the discovered contents to the customer for review and approval. According to some embodiments, whether to publish or provide to the customer depends on the manner in which the tool was initiated.

In some implementations, the automatic discovery tool outputs a descriptor file. The descriptor file is used by the customer to verify the findings of the automatic discovery tool and approve them for publishing. Once approved, the descriptor file is provided to the tool, and provides the tool with the information necessary to locate the various files that will compile the API. According to different embodiments, the customer may be DevOps or a developer.

Implementing the automatic discovery tool may provide a process for efficiently locating and publishing APIs. For example, a given API may include several parts, and call several external files. Additionally, that API may have several related documents that are necessary for its publishing. These component parts may be located in different regions of a particular repository, or may even be stored in multiple different repositories by an API developer. The automatic discovery tool may automatically identify the relevant files and/or documents corresponding to a particular API, and prepare those files for publishing the API to an application exchange system. In this manner, the automatic discovery tool more efficiently manages APIs and data in computer systems and/or enterprise computer systems.

Additionally, implementing the automatic discovery tool in a development pipeline provides continuous integration and continuous deployment (CI/CD) of new and updated API implementations. As developers continue to update API implementations or release new versions, the automatic discovery tool may continue to publish updated APIs. By implementing the automatic discovery tool, API development systems may streamline the deployment and publication of new APIs. Further, implementing the automatic discovery tool allows developers to focus on building and implementing APIs. This automation and self-discovery of new APIs reduces wasted computer resources corresponding to developer intervention.

Various embodiments of these features will now be discussed with respect to the corresponding figures.

Figure 1:
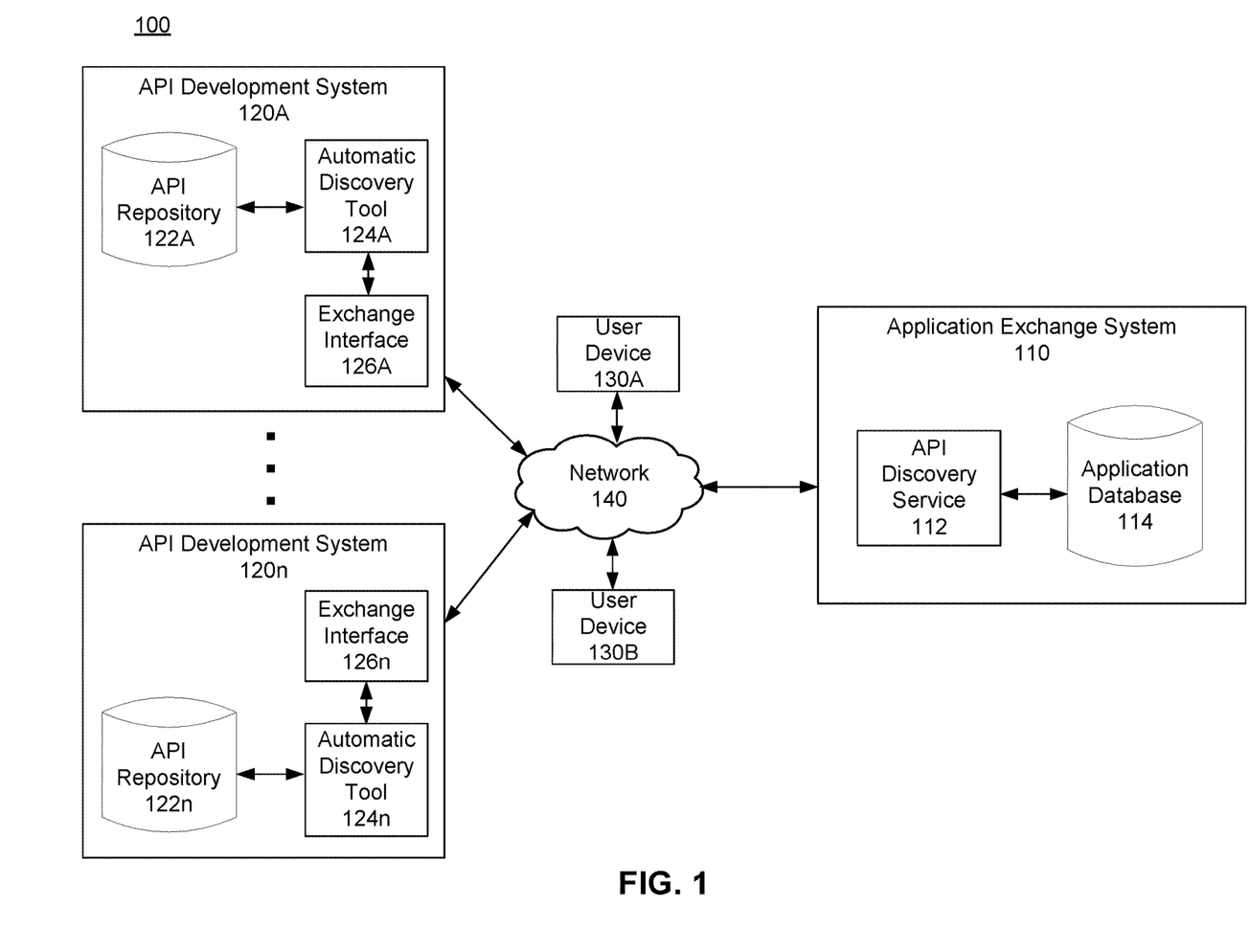
FIG. 1 depicts a block diagram of an Application Programming Interface (API) discovery environment, according to some embodiments.

FIG. 1 depicts a block diagram of an Application Programming Interface (API) specification discovery environment 100, according to some embodiments. API specification discovery environment 100 includes application exchange system 110, API development systems 120, user device 130, and/or network 140.

Application exchange system 110 may be implemented using computer system 600 as further described with reference to FIG. 6. For example, application exchange system 110 may be implemented using one or more servers and/or databases. Application exchange system 110 may communicate with user devices 130 and/or API development systems 120 over network 140. Network 140 may include any combination of Local Area Networks (LANs), Wide Area Networks (WANs), and/or the Internet.

Application exchange system 110 may provide an application exchange platform. The application exchange platform may be an application marketplace or online store allowing consumers to install, implement, and/or download applications, which may include services, software, extensions, and/or programs. The application exchange platform may also be a cloud-based application marketplace. This may allow users to identify applications to implement into cloud-based computing platforms. The applications may have corresponding APIs with API specifications. Application exchange system 110 publishes the API specifications on the application exchange platform for viewing and/or use by consumers or implementers of the API.

The consumers or implementers may use a user device 130 to access application exchange system 110 via network 140. User device 130 may be a desktop personal computer, workstation, laptop, Personal Digital Assistant (PDA), smartphone, smartwatch, wearable device, augmented reality (AR) device, virtual reality (VR) device, and/or computer system 600. Using user device 130, users may access application exchange system 110 to view or browse applications, APIs, and/or API specifications. Application exchange system 110 may generate one or more graphical user interfaces (GUIs) for display on user device 130 to display data corresponding to the applications, APIs, and/or API specifications. Application exchange system 110 may store this data in application database 114. When a user device 130 accesses application exchange system 110, API specification data may be retrieved from application database 114, formatted, and transmitted to user device 130 for viewing. User device 130 may also install, implement, and/or download applications via the GUIs. The applications may utilize the APIs corresponding to the API specifications.

To receive and/or store APIs and/or API specifications, application exchange system 110 includes an API discovery service 112. API discovery service 112 identifies APIs within the repository 122, and packages those APIs for publishing, as will be discussed in further detail below. API discovery service 112 stores the APIs in application database 114. In some embodiments, API discovery service 112 may be a messaging interface configured to exchange messages and/or data packets with API development system 120. In some embodiments, API discovery server 112 may include its own automatic discovery tool 124. Provided that the API discovery tool within the Application Exchange System 110 is given access to the customer-side API repository 122, the API discovery tool within the Application Exchange System 110 can also perform the automatic discovery and publishing of customer APIs.

One or more API development system 120 may provide APIs to be discovered and provided to application exchange system 110. An API development system 120 may be a computer system, a cloud-computing system, an enterprise system, a server, and/or other computer device allowing an API developer to draft APIs and their numerous different component files. In some embodiments, an API development system 120 may be implemented using computer system 600 as further described with reference to FIG. 6.

To provide the API, the customer need only store the various components of a given API within their API repository 122. Either on command, or automatically (depending on implementation), the automatic discovery tool 124 reviews the contents of the API repository 122 to identify and package APIs. Specifically, in an automatic publishing implementation, the automatic discovery tool 124 scans the API repository and automatically packages and publishes all APIs found, without customer input, customization, or authorization. In some embodiments, this mode is carried out by a server-side automatic discovery tool located in the Application Exchange System 110 or elsewhere at a provider of the automatic discovery service.

Alternatively, in a manual discovery implementation, the automatic discovery tool 124 is initiated by the customer using the automatic discovery tool 124 located in their own API development system 120. In this instance, the automatic discovery tool 124 performs the same functionality of locating the APIs within the API repository 122. However, the files found are not packaged for publishing, but rather are provided to the customer in a list. The customer then reviews the list and edits it as desired to generate a descriptor file. The descriptor file is then provided to the API discovery server 112 via the network 140, which uses the descriptor file to retrieve the API components for publishing. In some embodiments, an administrator of API development system 120 may implement the automatic discovery tool 124 in an API development pipeline. The administrator may be DevOps engineer and/or an administrator responsible for software development and/or IT operations.

In some embodiments, the administrator may use the descriptor file to designate APIs to be monitored, cataloged or published. The descriptor file may identify APIs and/or their corresponding API specification files stored in API repository 122. API repository 122 may be one or more memory devices or databases storing elements of an API and other computer files. In some embodiments, elements of an API may be stored in multiple repositories 122 corresponding to an API development system 120. For example, while API repository 122A is depicted as a single memory device, API repository 122A may be implemented as multiple memory devices storing different components or elements of an API. Further, different API development systems 120 may have different API repository 122 configurations. The API may be divided and/or segmented into different files. In some embodiments, the descriptor file generated at an API development system 120 may designate the one or more API repositories 122 including the one or more API files.

The descriptor file may also identify metadata complementing the API. This metadata may be used by application exchange system 110 to catalog and/or organize the API and/or the publication of the API to the application exchange platform. In some embodiments, the descriptor file and/or the API may include the metadata. The metadata may include, for example, tags, categories, ownership data, and/or other metadata used for cataloging and publishing the API. The automatic discovery tool 124 may use this metadata when validating, cataloging, and/or publishing the API. In this manner, the automatic discovery tool 124 may identify the API files and/or metadata specified in the descriptor file to automatically catalog and/or publish the API. In some embodiments, automatic discovery of APIs may include automatic cataloging of API specifications.

As discussed above, the automatic discovery tool 124 also locates dependencies of a particular API. Dependencies may refer to those files and/or data relied upon or called by an API. For example, the API may refer to an external data file and/or incorporate an external functional call. In this manner, the API depends on the data file and external functional call. A tree of dependencies may refer to multiple dependency files. For example, the API specification may depend on data file A, but data file A depends on data file B. According to embodiments, the automatic discovery tool 124 identifies and/or retrieves these dependencies when analyzing or validating the API.

Figure 2:
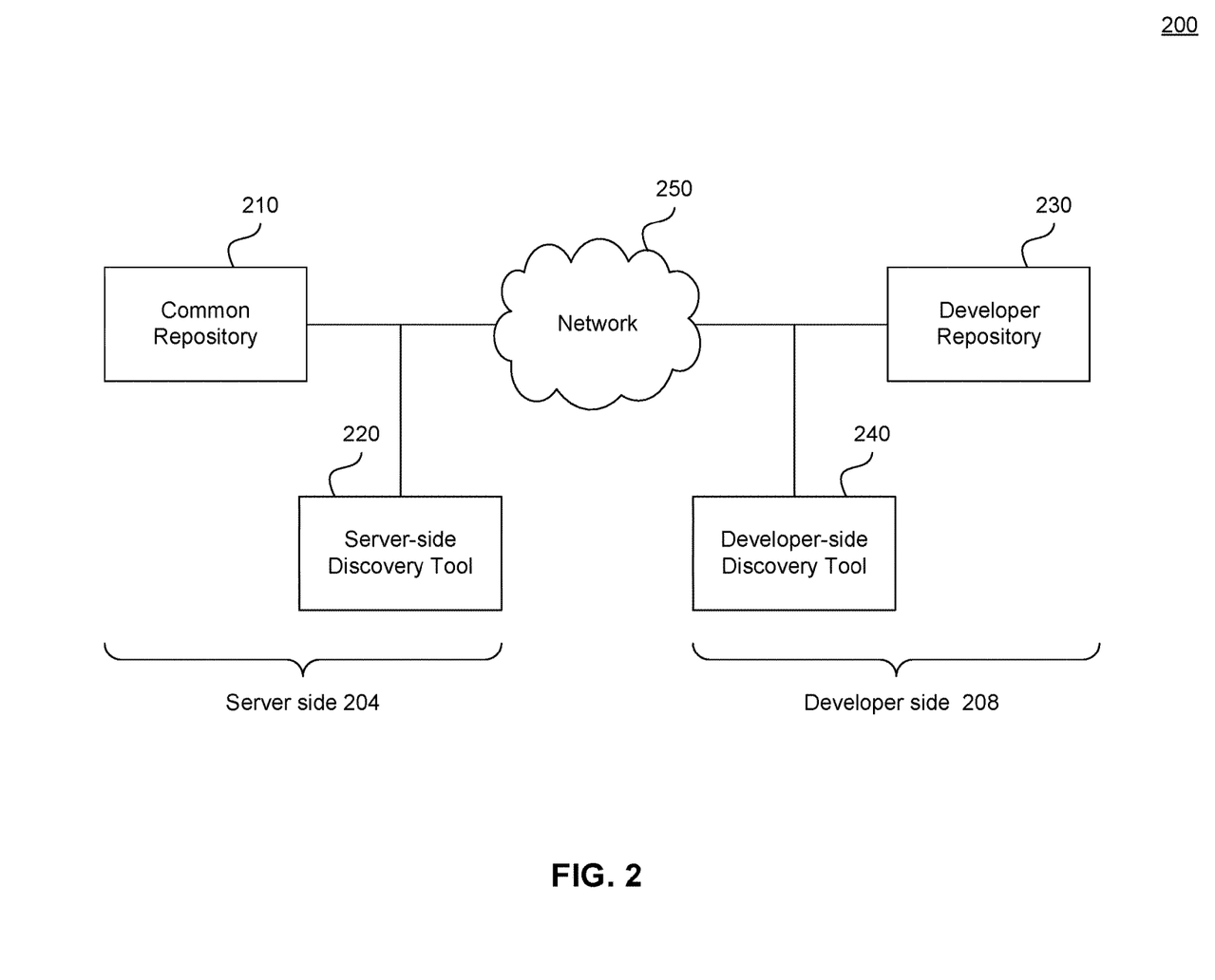
FIG. 2 depicts a block diagram of an exemplary Application Programming Interface (API) discovery environment, according to some embodiments.

FIG. 2 depicts a block diagram of an exemplary automatic discovery environment 200, according to some embodiments. FIG. 2 is a simplified view of the automatic discovery environment 100 illustrated in FIG. 1. As shown in FIG. 2, a server side 204 includes a common repository 210 and a server-side discovery tool 220. According to some embodiments, the server side 204 is centralized and/or common to the various developers that may be using the automatic discovery service. Meanwhile, a developer side 208 includes a developer repository 230 and a developer-side discovery tool 240. According to some embodiments, the developer side 208 is local to one or more individual developers. In some configurations, the server-side discovery tool 220 and the developer-side discovery tool 240 are independent of one another. However, in other configurations, the developer-side discovery tool 240 is an instance of the server-side discovery tool 220, or is implemented merely by providing access to the server-side discovery tool 220 of the developer repository 230. The server side 204 and the developer side 208 communicate with each other via a network 250.

As discussed above, the automatic API discovery mechanisms can be implemented either manually or automatically. Whereas an automatic implementation is triggered automatically and results in automatic publishing of APIs, manual implementation may be triggered by the developer, and provides a descriptor file to the developer for editing prior to publishing. As shown in FIG. 2, in an automatic scenario, the server-side discovery tool 220 accesses the developer repository 230 via the network 250. The discovery tool 220 identifies all APIs and their respective components/dependents within the developer repository 230.

In the automatic implementation, the server-side discovery tool 220 periodically performs API detection of the developer repository. According to different embodiments, this can be triggered at a particular time, after a particular amount of time has elapsed, or on command by the customer or an administrator. The automatic discovery tool 220 identifies the APIs, and collects all of their different components and/or metadata located on the developer repository 230. Once all the various files have been collected, the discovery tool 220 stores them on the common repository 210. Then the discovery tool 220 prepares the API and all of its components for publishing, and then publishes the API without developer input or approval.

In the manual implementation, the developer-side discovery tool performs the discovery operation in response to request from the developer. However, it is conceivable that a developer could choose to have the discovery tool 240 automatically perform the automatic discovery at regular intervals or at prescheduled times. The discovery tool 240 reviews the contents of the developer repository 230 and identifies APIs and their dependents in the manner discussed below. Once the API and all of is components have been identified and located, the discovery tool 240 generates a descriptor file with the information of those files and provides it to the developer for review. The developer can edit, approve, or reject the descriptor file. In either of the former two scenarios, the finalized descriptor file is then transmitted to the server side discovery tool 220 via the network 250. The server-side discovery tool 220 then retrieves the files described by the descriptor file from the developer repository and carries out the packaging and publishing of the API as discussed above. According to some embodiments, the manual discovery implementation can be instead performed by an instance of the server-side discovery tool on the developer system, or can be carried out by the server-side discovery tool 220 over the network 250.

Figure 3:
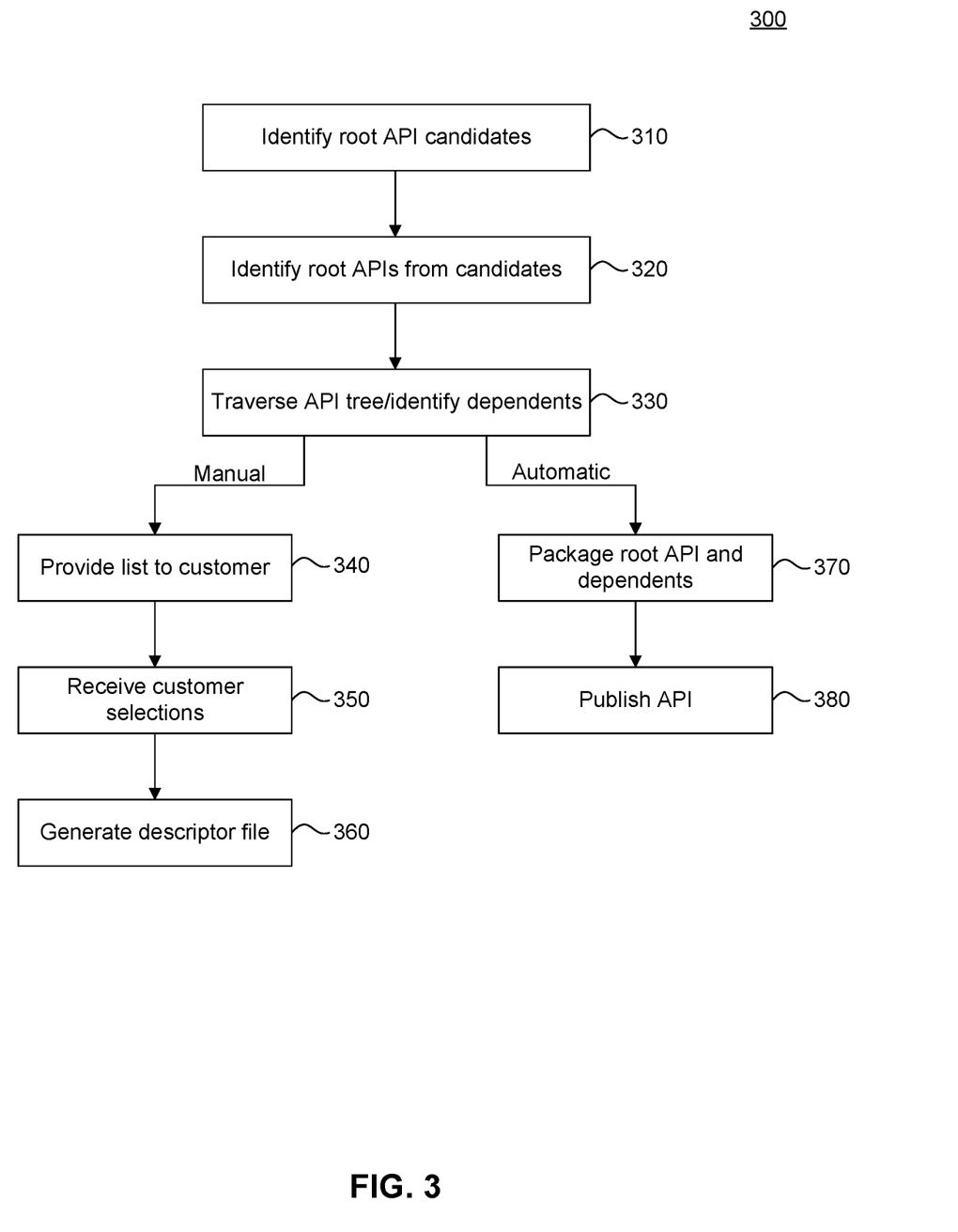
FIG. 3 depicts a flowchart diagram of an exemplary method for discovering APIs in a repository, according to some embodiments.

FIG. 3 depicts a flowchart diagram of an exemplary method 300 for discovering APIs in a repository, according to some embodiments.

As discussed above, the automatic discovery tools are configured to review the contents of a particular repository and identify APIs and their various components. In order to achieve this, the tool first identifies root API candidates 310. According to various embodiments, this is achieved by the discovery tool first identifying root API candidates. A root API is an object representing the top level of the API, and thus constitutes the main file for carrying out an API. In order to identify the root APIs, the discovery tool conducts a first pass of the repository in which in looks for files following a particular format or having specific notations that are consistent with various known API standards. In particular, RAML, OAS, and AsyncAPI are well-known API standards and each has certain formatting and notation schemes. Therefore, the discovery tool first checks the files in the repository for any that adhere to these standard formats. These files are considered root API candidates because this first pass cannot guarantee that the identified files are actually root APIs, only that they look like root APIs.

Therefore, in the next step, the root APIs are identified from the candidate root APIs 320. In this step, a parser is used to more carefully review the candidate APIs and determine whether they are, in fact, root APIs. This two-step identification process is more cost-effective that simply using the parser because the parser is both an expensive and time-consuming operation compared to the format-matching operation described above. As a result of these processes, a final list of one or more root APIs is identified.

Once the final list of APIs is identified, the parser is used to traverse the API tree and identify dependents 330. In this operation, the parser runs the root API and listens to the executing API for function and other external file calls. This identifies to the parser which other files are needed for successful operation of the API. This produces a list of files associated with the API, and is described in further detail with respect to FIG. 5, below.

If the discovery tool was implemented manually, then the list of files associated with the API is provided to the customer 340. In some embodiments, the list is provided to the customer in the form of a descriptor file. The then reviews the list to determine whether there are any files that should not be published, or whether there are any alternative files that should be published. They are permitted to edit the list, or can approve or disapprove the list as needed. Once the customer has made their edits, the discovery tool receives the customer selections 350 of the files to be published. The discovery tool then generates an updated descriptor file with the customer's selections 360. According to some embodiments, this updated descriptor file can then be transmitted to the server side, which will use the descriptor file to quickly locate the necessary files for packaging and publishing the API.

Alternatively, if the discovery tool was implemented in automatic mode, then the discovery tool uses the identified list of API documents to locate each of the necessary files for implementing the API. These files (e.g., the root API and its dependents) are then packaged 370 and the API is published 380. Notably, in the automatic mode, the customer does not provide any input or approval of the identified files.

Figure 4:
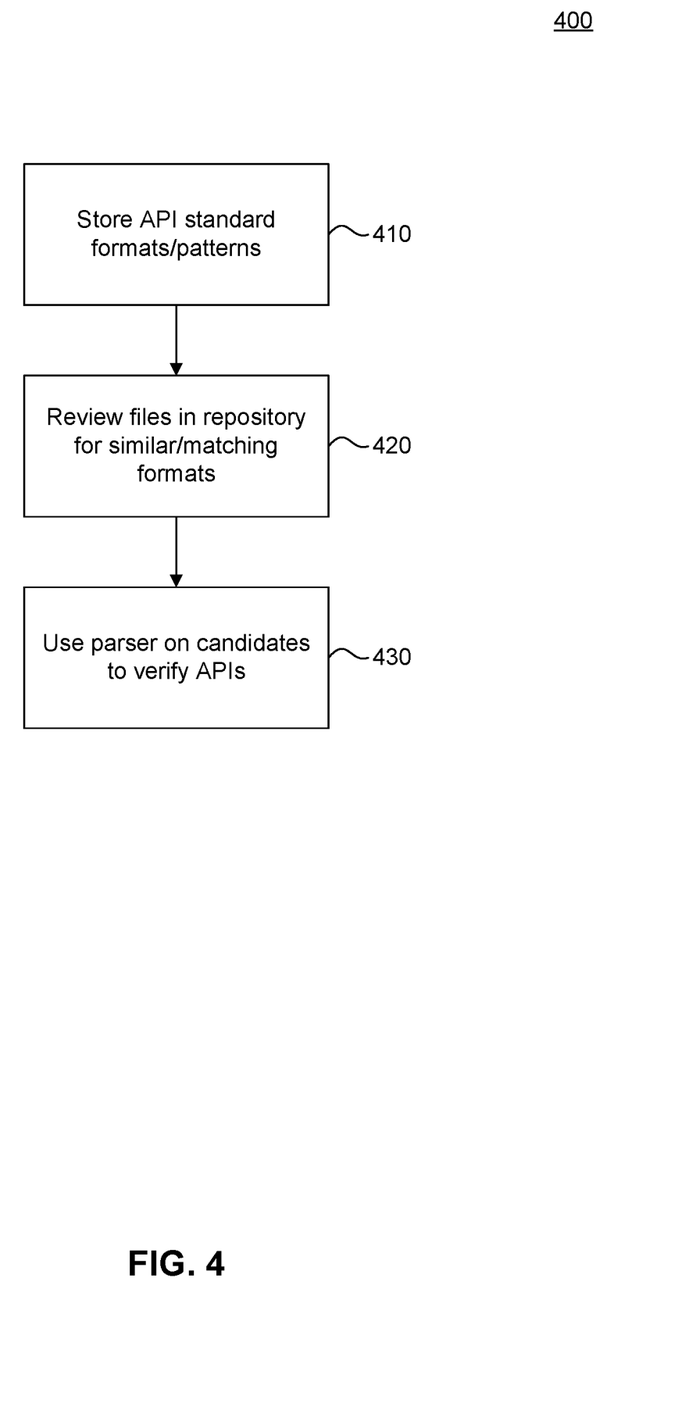
FIG. 4 depicts a flowchart diagram of an exemplary method for identifying APIs as part of the discovery method, according to some embodiments.

FIG. 4 depicts a flowchart diagram of an exemplary method for identifying APIs as part of the discovery method, according to some embodiments.

As discussed above with respect to FIG. 3, the discovery tool is configured to identify root APIs in a two-step process. As shown in FIG. 4, the discovery tool first stores the formats, patterns, notations, and other identifiers of known API standards 410. Examples of such standards include RESTful API Modeling Language (RAML), OpenAPI Specification (OAS), and AsyncAPI. The discovery tool then reviews files in the relevant repository for similar formats, patterns, notations, and other identifiers 420. The files that are sufficiently similar to the standardized identifiers are identified as root API candidates.

Once the discovery tool has finished its review of the repository and identified all root API candidates, then the discovery tool uses a parser on the list of candidates 430. The parser is a tool that is capable of more definitively determining whether a file is a root API file. The parser is applied to the group of root API candidates, and produces a final list of root APIs.

Figure 5:
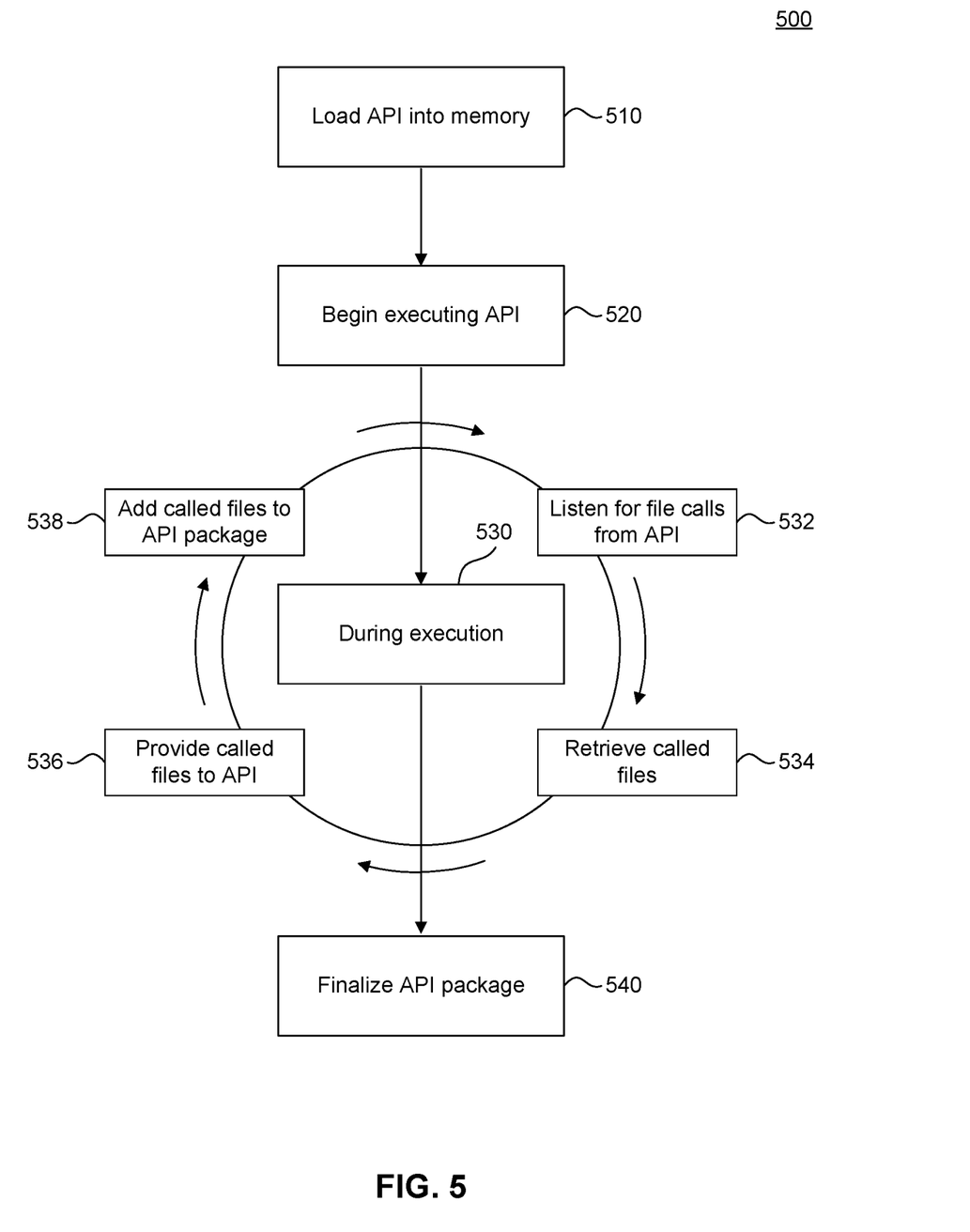
FIG. 5 depicts a flowchart diagram of an exemplary method for identifying dependents of an API, according to some embodiments.

FIG. 5 depicts a flowchart diagram of an exemplary method 500 for identifying dependents of an API, according to some embodiments.

As discussed above, once the root APIs have been definitively identified, the discovery tool must then determine what other files are needed to support the root API. In other words, the system must identify the dependents and other related files to the root API. In order to do this, the system first loads the root API into memory 510. Next, the system executes the root API 520 that was loaded into memory. In embodiments, this can be run using a virtual machine or other virtual instance of the API so as to allow for the necessary monitoring that takes place during this process.

While the API is executing 530, the system performs a number of tasks in order to identify the external files needed by the API. In embodiments, this process is performed by a parser. During execution, the parser listens for file calls from the API 532. Using these file calls, the parser retrieves the called files from the repository 534. Then the parser provides the retrieved files to the API being executed 536 and adds the retrieved files to an API package 538. This continues throughout the duration of the execution of the loaded API until an entire API tree has been traversed and all external files have been identified. Once this is complete, the execution of the API 530 concludes and the discovery tool finalizes the API package 540. In various embodiments, the discovery tool may instead output a descriptor to be used for generating the API package at time of publication.

Figure 6:
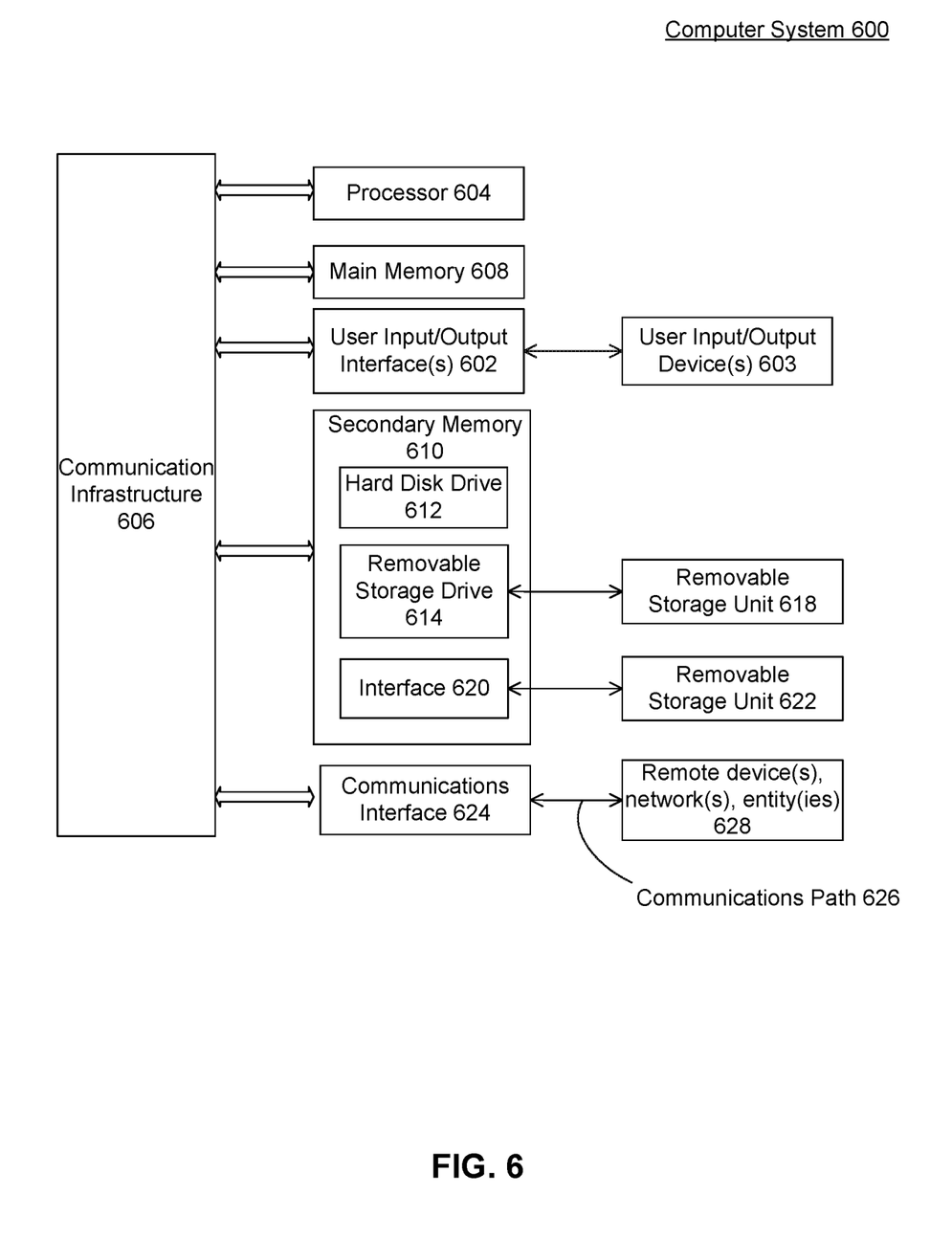
FIG. 6 depicts an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript™ Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for automatically identifying an Application Programming Interface (API) that includes a plurality of computer files, the method comprising:

reviewing each of the plurality of computer files for one or more API indicia to determine a set of root API candidates that is a subset of the plurality of computer files;

examining the set of root API candidates to identify a confirmed root API;

traversing an API tree associated with the confirmed root API, the traversing including executing the confirmed root API and listening for function and external file calls during the executing;

identifying additional components associated with the confirmed root API;

locating the additional components of the confirmed root API, the additional components being located in a plurality of different data repositories;
in response to the reviewing having been automatically initiated:
automatically retrieving the additional components from the plurality of different data repositories; and
automatically publishing the API that includes the confirmed root API and the additional components;
in response to the reviewing having been initiated by a user:
providing the user with a list of API components, the API components including the confirmed root API, API files found from the traversing, and the additional components; and
receiving from the user a descriptor file that includes selected API components from the list for publishing;
retrieving the API components and the additional components identified in the descriptor file from the plurality of different data repositories; and
publishing the API that includes the confirmed root API and the additional components; and
storing the confirmed root API and the retrieved additional components in a common data repository.

2. The method of claim 1, wherein the API indicia include one or more of a formatting, a pattern, or a notation consistent with a standard API format.

3. The method of claim 1, wherein the additional components include related documents necessary for publishing of the confirmed root API, including specifications and markdown documents.

4. The method of claim 1, wherein the traversing the API tree includes:
retrieving external files called by the confirmed root API during the executing;
providing the retrieved external files to the confirmed root API; and
adding the retrieved external files to a list that includes a component data file.

5. The method of claim 4, wherein the identifying the additional components of the confirmed root API includes listening for calls by the confirmed root API to the external files.

6. The method of claim 5, wherein the identifying the additional components of the confirmed root API further includes:
retrieving external files from a data repository;
providing the external files to the confirmed root API under execution; and
adding the external files to a list of API components.

7. The method of claim 6, wherein the list of API components includes the confirmed root API and is the descriptor file.

8. An Application Programming Interface (API) discovery system for identifying an API associated with a customer, comprising:
a common repository that stores customer API data;
a computing device communicatively coupled to the common repository having one or more processors configured to:
access the common repository;
review data files located in the common repository to identify a set of root API candidates;
review the set of root API candidates to identify a confirmed root API;
retrieve the confirmed root API from the common repository;
identify component data files associated with the confirmed root API, the component data files being located in a plurality of different data repositories, the identifying including executing the confirmed root API and listening for function and external file calls during the executing;
in response to the reviewing having been automatically initiated:
automatically retrieve the component data files from the plurality of different data repositories; and
automatically publish the API that includes the confirmed root API and the component data files;
in response to the reviewing having been initiated by a user:
provide the user with a list of API components, the API components including the confirmed root API and the component data files; and
receive from the user a descriptor file that includes selected API components from the list for publishing;
retrieve the API components and the component data files identified in the descriptor file from the plurality of different data repositories based on the descriptor file;
publish the API that includes the confirmed root API and the component data files; and
store the confirmed root API and the retrieved API components in a common data repository.

9. The API discovery system of claim 8, further comprising a memory that stores a plurality of attributes associated with a plurality of standard API formats.

10. The API discovery system of claim 9, wherein to identify the set of root API candidates the one or more processors are configured to determine whether the data files located in the common repository include one or more of the plurality of attributes.

11. The API discovery system of claim 8, wherein the API components include related documents necessary for publishing of the confirmed root API, including specifications and markdown documents.

12. The API discovery system of claim 8, wherein the one or more processors are further configured to traverse an API tree associated with the confirmed root API in order to identify the component data files.

13. The API discovery system of claim 12, wherein to traverse the API tree, the one or more processors are configured to:
retrieve external files called by the confirmed root API during the executing;
provide the retrieved external files to the confirmed root API; and
add the retrieved external files to a list that includes the component data files.

14. The API discovery system of claim 13, wherein the API discovery system is a virtual instantiation of the confirmed root API.

15. A method for automatic discovery of an Application Programming Interface (API) within a data repository that includes a plurality of data files, the method comprising:
accessing the data repository;
identifying a plurality of root API candidates within the data repository as the data files within the data repository that have at least one attribute associated with a standard API format;

reviewing the plurality of root API candidates to identify a confirmed root API; and reviewing the confirmed root API to identify API component files, the API component files being located in a plurality of different locations, the reviewing of the plurality of root API candidates including executing the confirmed root API and listening for function and external file calls during the executing;

in response to the reviewing of the plurality of root API candidates having been automatically initiated:
  automatically retrieving the API component files associated with the confirmed root API; and
  automatically publishing the API that includes the API component files;

in response to the reviewing of the plurality of root API candidates having been initiated by a user:
  providing the user with a list of the API component files; and
  receiving from the user a descriptor file that includes selected API components from among the API component files; and retrieving the API component files from the plurality of different locations based on the descriptor file;

publishing the API that includes the confirmed root API and the identified API component files; and storing the confirmed root API and the identified API component files in the data repository.

16. The method of claim 15, wherein the API component files include related documents necessary for publishing the confirmed root API, including specifications and markdown documents.

17. The method of claim 16, further comprising receiving a revised list from the user that differs from the list.

18. The method of claim 17, wherein the list and the revised list are descriptor files.

19. The method of claim 17, further comprising:
obtaining data files listed in the revised list;
packaging the obtained data files into an API package; and
publishing the API package.

20. The method of claim 15, further comprising:
obtaining the confirmed root API and the API component files from the data repository;
packaging the confirmed root API and API component files into an API package; and
publishing the API package without user input.

* * * * *